United States Patent
Liem et al.

(10) Patent No.: US 9,811,666 B2
(45) Date of Patent: Nov. 7, 2017

(54) SYSTEM AND METHOD PROVIDING DEPENDENCY NETWORKS THROUGHOUT APPLICATIONS FOR ATTACK RESISTANCE

(75) Inventors: Clifford Liem, Ottawa (CA); Yongxin Zhou, Mequon, WI (US); Yuan Xiang Gu, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 120 days.

(21) Appl. No.: 14/006,490

(22) PCT Filed: Mar. 24, 2011

(86) PCT No.: PCT/CA2011/050157
§ 371 (c)(1),
(2), (4) Date: Sep. 20, 2013

(87) PCT Pub. No.: WO2012/126083
PCT Pub. Date: Sep. 27, 2012

(65) Prior Publication Data
US 2014/0013427 A1    Jan. 9, 2014

(51) Int. Cl.
*G06F 21/57*    (2013.01)
*G06F 21/14*    (2013.01)
*G06F 21/12*    (2013.01)

(52) U.S. Cl.
CPC .......... *G06F 21/572* (2013.01); *G06F 21/125* (2013.01); *G06F 21/14* (2013.01)

(58) Field of Classification Search
None
See application file for complete search history.

(56) References Cited

U.S. PATENT DOCUMENTS

| 6,088,452 A | 7/2000 | Johnson et al. |
| 6,594,761 B1 | 7/2003 | Chow et al. |

(Continued)

FOREIGN PATENT DOCUMENTS

| FR | 2871255 A1 | 12/2005 |
| JP | 2005266887 A | 9/2005 |

(Continued)

OTHER PUBLICATIONS

Jakubowski, "Tamper-Tolerant Software: Modeling and Implementation", 2009, pp. 1-16.*

(Continued)

*Primary Examiner* — Benjamin Lanier
(74) *Attorney, Agent, or Firm* — Rimon, P.C.; Marc S. Kaufman

(57) ABSTRACT

A method and system is provided to automatically propagate dependencies from one part of a software application to another previously unrelated part. Propagation of essential code functionality and data to other parts of the program serves to augment common arithmetic functions with Mixed Boolean Arithmetic (MBA) formulae that are bound to pre-existing parts of the program. A software application is first analyzed on a compiler level to determine the program properties which hold in the program. Thereafter, conditions are constructed based on these properties and encoded in formulae that encode the condition in data and operations. Real dependencies throughout the application are therefore created such that if a dependency is broken the program will no longer function correctly.

32 Claims, 6 Drawing Sheets

(56) References Cited

U.S. PATENT DOCUMENTS

| | | |
|---|---|---|
| 6,668,325 B1 | 12/2003 | Collberg et al. |
| 6,779,114 B1 | 8/2004 | Gu et al. |
| 6,842,862 B2 | 1/2005 | Chow et al. |
| 7,054,443 B1 | 5/2006 | Jakubowski et al. |
| 7,287,166 B1 | 10/2007 | Chang et al. |
| 7,430,670 B1 | 9/2008 | Horning et al. |
| 7,506,177 B2 | 3/2009 | Chow et al. |
| 7,779,270 B2 * | 8/2010 | Horning et al. ............ 713/187 |
| 7,841,009 B1 * | 11/2010 | Smith ............................ 726/26 |
| 8,112,636 B1 * | 2/2012 | Canzanese et al. |
| 8,171,306 B2 * | 5/2012 | Venkatesan et al. ........ 713/187 |
| 8,176,473 B2 * | 5/2012 | Jacob et al. ................. 717/120 |
| 8,429,637 B2 * | 4/2013 | Myles et al. ................. 717/159 |
| 8,615,735 B2 * | 12/2013 | McLachlan et al. ........ 717/110 |
| 8,621,187 B2 * | 12/2013 | Vauclair ...................... 712/234 |
| 8,756,435 B2 * | 6/2014 | Lerouge et al. ............. 713/190 |
| 8,775,826 B2 * | 7/2014 | Farrugia et al. ............ 713/190 |
| 8,819,637 B2 * | 8/2014 | Abadi et al. ................. 717/126 |
| 2004/0139340 A1 | 7/2004 | Johnson et al. |
| 2006/0031686 A1 | 2/2006 | Atallah et al. |
| 2006/0101047 A1 | 5/2006 | Rice |
| 2006/0195906 A1 | 8/2006 | Jin et al. |
| 2011/0035601 A1 * | 2/2011 | Davidson et al. ........... 713/190 |
| 2011/0214179 A1 * | 9/2011 | Chow et al. .................. 726/22 |

FOREIGN PATENT DOCUMENTS

| | | |
|---|---|---|
| JP | 2010072958 A | 4/2010 |
| JP | 2010541086 A | 12/2010 |
| WO | 9901815 A1 | 1/1999 |
| WO | 2009108245 | 9/2009 |
| WO | 2010127438 A1 | 11/2010 |

OTHER PUBLICATIONS

Naumovich, "Preventing Piracy, Reverse Engineering, and Tampering", 2003. pp. 64-71.*
Wurster, "A generic attack on checksumming-based software tamper resistance", 2005, pp. 1-12.*
International Search Report and Written Opinion dated Dec. 22, 2011.
Extended European Search Report cited in corresponding European Application No. 11861595.4 dated Apr. 22, 2015.
Cohen F B Ed—Weippl Edgar R: "Operating System Protection Through Program Evolution", Computers & Security, Elsevier Science Publishes, vol. 12, No. 6, Oct. 1, 1993.
Collberg C et al: "A Taxonomy of Obfuscating Transformations", Technical Report Department of Computer Science University of Auckland, No. 148, Jul. 1, 1997.

* cited by examiner

SYSTEM AND METHOD PROVIDING DEPENDENCY NETWORKS THROUGHOUT APPLICATIONS FOR ATTACK RESISTANCE

COPYRIGHT NOTICE

A portion of the disclosure of this patent document contains material which is subject to copyright protection. The copyright owner has no objection to the facsimile reproduction by anyone of the patent document or the patent disclosure, as it appears in the official patent file or records, but otherwise reserves all copyright rights whatsoever.

FIELD OF THE INVENTION

The present invention relates generally to software protection by concealment and tamper-resistance. More particularly, the present invention relates to protection of software applications whereby concealment and tamper-resistance techniques are combined to form highly dependent code having an aggressive set of dependencies automatically weaved throughout the protected application to thereby increase resistance to attack.

BACKGROUND OF THE INVENTION

In the ever-growing computer software industry, many examples of unauthorized or unlicensed rogue usage by an attacker (e.g., software hacker) of valuable and sensitive software applications exist. Moreover, as new software applications are deployed in the field, the modular, function-based structure of their underlying program code often makes such software applications easy targets for code-lifting and data-lifting attacks.

Current software protection technology typically concentrates on two primary areas of defense including concealment and tamper-resistance. Concealment commonly involves providing a mechanism for hiding sensitive assets and functionalities from the attacker. Tamper-resistance commonly involves providing a mechanism whereby the protected software reacts differently if part of the software is altered by an attacker. However, neither of these techniques adequately address code-lifting and data-lifting attacks.

For example, a dynamic-link library (DLL) may easily be identified and reused in a rogue context, simply by invoking available functions from an attacker's application. Alternatively, functions or code snippets may be lifted from the original program and reused in an attackers program. Furthermore, once the use of data is identified by an attacker, any data may easily be extracted from the sections of an executable file or from a data file to be read and used from a hacker's application, despite the amount of data being used. Still further, even if the designer of the software application is able to obfuscate the mechanics of the program, a determined attacker may lift the assembly code that invokes the functionality and thereafter reimplement the code in his own rogue software application. There are hacker tools (e.g., disassemblers and decompilers) that aid in this process of attacking the software.

Another example of software protection includes known node-locking approaches that bind a program to a specific device whereby a unique identifier (ID) is taken from a piece of hardware and the program made to be dependent on the given ID. This could be the calculation of a device key that is constructed through the use of hardware identifiers like the media access control (MAC) address, hardware disk IDs, and other fingerprint information. The algorithm that uses these identifiers to produce the key may be an elaborate process of function and data. However, in the end, the entire set of code and data is vulnerable to a lifting attack.

It is, therefore, desirable to provide attack resistance that includes improved tamper resistance and concealment properties.

SUMMARY OF THE INVENTION

It is an object of the present invention to obviate or mitigate at least one disadvantage of previous software protection mechanisms.

The present invention involves a system and method providing dependency networks throughout a software application in order to increase the attack resistance of such software application. The system and method include combined tamper resistance and concealment mechanisms providing for generation of a highly dependent code underlying such software application and which is resistant to attack. In general, an aggressive set of dependencies are provided by way of the present invention that are automatically weaved throughout a software application. More importantly, these dependencies prevent any part of the given software application—i.e., sub-parts including for example code portions or software modules—to be used on its own. In addition to the tamper resistance properties, the present inventive technique includes concealment properties which make it difficult to identify and remove the dependencies that are inserted into the given software application.

In a first aspect, the present invention provides a method for providing attack resistance throughout a software application, the method comprising: identifying critical assets of the software application, the critical assets formed by one or more predetermined program properties; associating a program property function to a corresponding one of the critical assets; adjusting the associating step in accordance with user-defined tolerances; at one or more points of the software application, generating a calculated program property from the program property function; and verifying the calculated program property against a corresponding one of the one or more predetermined program properties.

In further aspect, the present invention provides a method for providing attack resistance throughout a software application, the method comprising: identifying critical assets along with original data and program dependencies from an intermediate compiler representation of the software application; prioritizing the critical assets in accordance with user-specific criteria; correlating the original data and program dependencies with the prioritized critical assets; obtaining user-specific control tolerances for the software application; inserting, with regard to the user-specific criteria and the user-specific control tolerances, new data and program dependency elements into the intermediate compiler representation of the software application to form an alternative intermediate representation; and generating a transformed software application from the alternative intermediate representation; wherein the transformed software application includes an enhanced dependency network providing increased attack resistance.

In yet another aspect, the present invention provides a system for providing attack resistance throughout a software application, the system comprising: a user specification of critical assets of the software application; an automatic program transformation mechanism embodied in software and configured to: identify original data and program dependencies from an intermediate compiler representation of the software application, prioritize the critical assets in accordance with user-specific criteria, correlate the original data and program dependencies with the prioritized critical assets, obtain user-specific control tolerances for the software application, insert, with regard to the user-specific criteria and the user-specific control tolerances, new data and program dependency elements into the intermediate compiler representation of the software application to form an alternative intermediate representation, and generate a transformed software application from the alternative intermediate representation; wherein the transformed software application includes an enhanced dependency network providing increased attack resistance.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally speaking, the present invention provides a method and system to automatically propagate dependencies from one part of a software application (or simply "program") to another previously unrelated part. The process may be repeated as many times as desired.

More specifically, the invention involves the propagation of essential code functionality and data to other parts of the program. The invention replaces common arithmetic functions with Mixed Boolean Arithmetic (MBA) formulae which are bound to pre-existing parts of the program. The program is first analyzed on a compiler level to determine the properties which hold in the program. Thereafter, conditions are constructed based on these properties and encoded in formulae which encode the condition in data and operations. This may then be used to create real dependencies throughout the application such that if a dependency is broken the program will no longer function correctly.

The present invention may be implemented either whereby a user performs identification of critical program assets or, alternatively, whereby a set of predetermined program property primitives are established in a library and an analyzer automatically determines the set of property primitives that apply to a user's program. In both alternatives, dependency carriers and bindings may be used to create a web of dependencies requiring the conditions of the program properties to hold. If a software lifting attack is done on a part of the code, then the likelihood of a program property holding is reduced, the condition no longer holds, and the part of the program which carries the dependency will cease to operate correctly.

Figure 1:
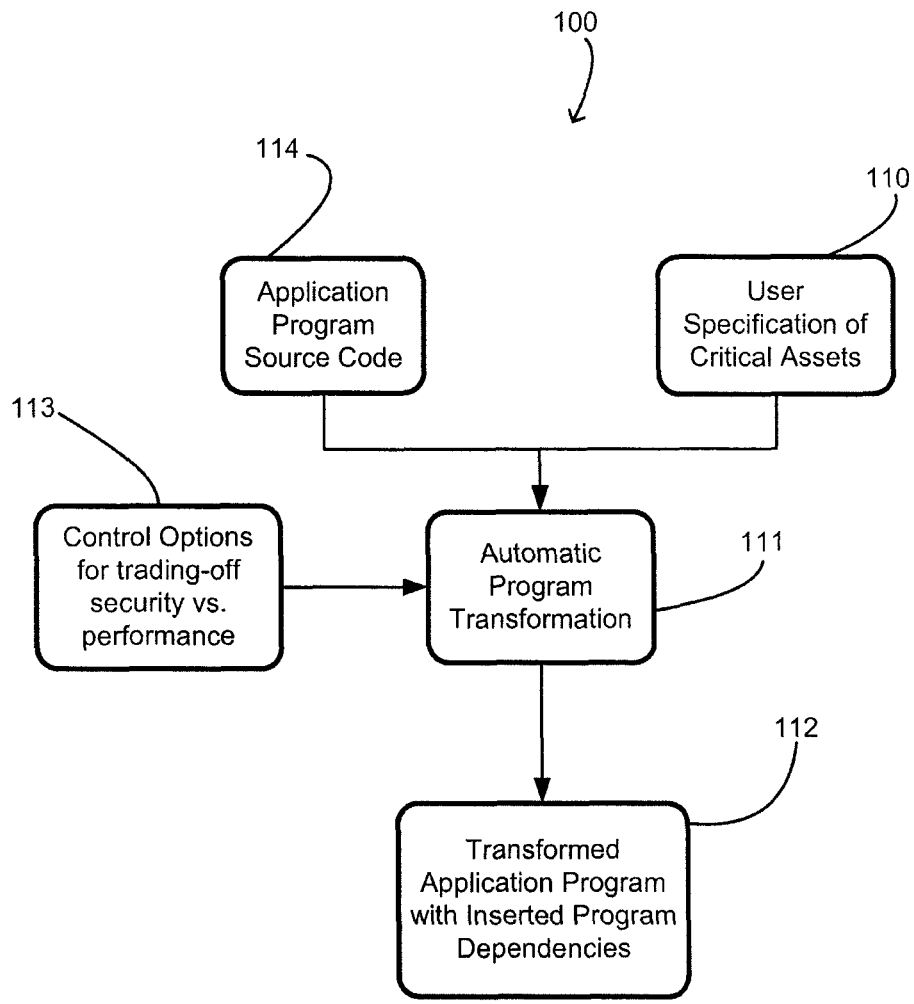
FIG. 1 is a generalized flow diagram of the transformation process in accordance with the present invention.

In FIG. 1, there is shown a generalized flow diagram of the transformation process 100 in accordance with the present invention. Here, there are shown the three inputs 110, 113, 114 to the inventive process. First, an application program in source code form 114 is provided. Secondly, a user specification of the critical assets of the program 110 (or alternatively may be the library of the set of property primitives that apply to a user's program as mentioned above) is provided. This user specification (or library set of property primitives) is a mark-up of the original application showing the relative priority of critical assets. The mark-up may take various forms including: language extensions on the programming language itself; a separate description that refers to the program; or a graphical user interface (GUI) that allows a user to highlight regions of the program. The third input includes control options (i.e., tolerances) 113 which allow the user to specify trade-offs between security, performance, and size targets for the application. These inputs 110, 113, 114 are processed by an automatic program transformation tool 111 to produce a transformed application program with inserted program dependencies. The resultant transformed program 112 has the same behavior as the original input program under normal operating conditions. However, under conditions where the critical assets are under attack by an adversary, the program does not behave as expected. Such attacks may include, but are not limited to, the replacement of application data values with other data values, the replacement of code or parts of the program with other code, the redirection of the flow of control of the program to and/or from another source, and the lifting of part of the program for use in another context.

In further regard to the embodiment involving the user's identification of critical assets, the present invention provides a compiler-based transformation tool that begins at the critical assets and builds long and wide webs of dependencies to the asset by inserting operations, calls to functions, and the use of data. Operations and functions are aggressively merged to pre-existing functions of the application. Data from the application are analyzed and reused when possible. Additionally, data that is created is merged into data structures used by the application. The web of dependencies is expanded as far as possible within the size and performance tolerances of the user. As suggested above, this invention provides flexibility to trade off security and performance. For the purpose of high performance, the web of the dependencies may be tailored to avoid performance critical code while maintaining security goals. The endpoints of the web of dependencies may be strategically placed to optimize the security versus performance trade-offs. In the extreme case, the web of dependencies covers the whole application, meaning the critical assets are dependent universally.

In further regard to the embodiment involving the set of predetermined program property primitives established in a library, the present invention provides an analyzer that automatically determines the set of property primitives which apply to a user's program. The program is then modified based on an application of each primitive, carrying dependencies from one source point in a program to another target point. At the target point, a dependency binding is created to the program such that there is a reliance on certain conditions originally from the source point. This reliance ensures that if the source point in the program is directly attacked by modification, then side-effects will occur in the operation of the program at the target point. The result will be a program that does not behave within the expected parameters of the attacker.

There are multiple types of property primitives and additionally multiple ways in which the program may be modified based on the property primitive. Each type of property primitive has certain characteristics. For example, a constant integral property means that an entity of the program holds a constant value for the entire execution life-time of the program. This characteristic implies that the entity must have the constant integral value at points of use in the program, and will never take on other values. Based on this, examples of program manipulations that may be made include, but are not limited to: duplication of program entities for the original constant value; use of the constant value to calculate other values in the program; calculation of the constant value at initialization time; calculation of the constant value through alternate flows of the program so as to ensure only that it contain the correct value at the points of use in the program; or use of the entity in a conditional (e.g., equivalency, greater-than, less-than, . . . etc.) that will hold its validity at the appropriate times in the program (i.e., lifetime of the program, or use-points depending on calculations described in previous points).

Figure 2:
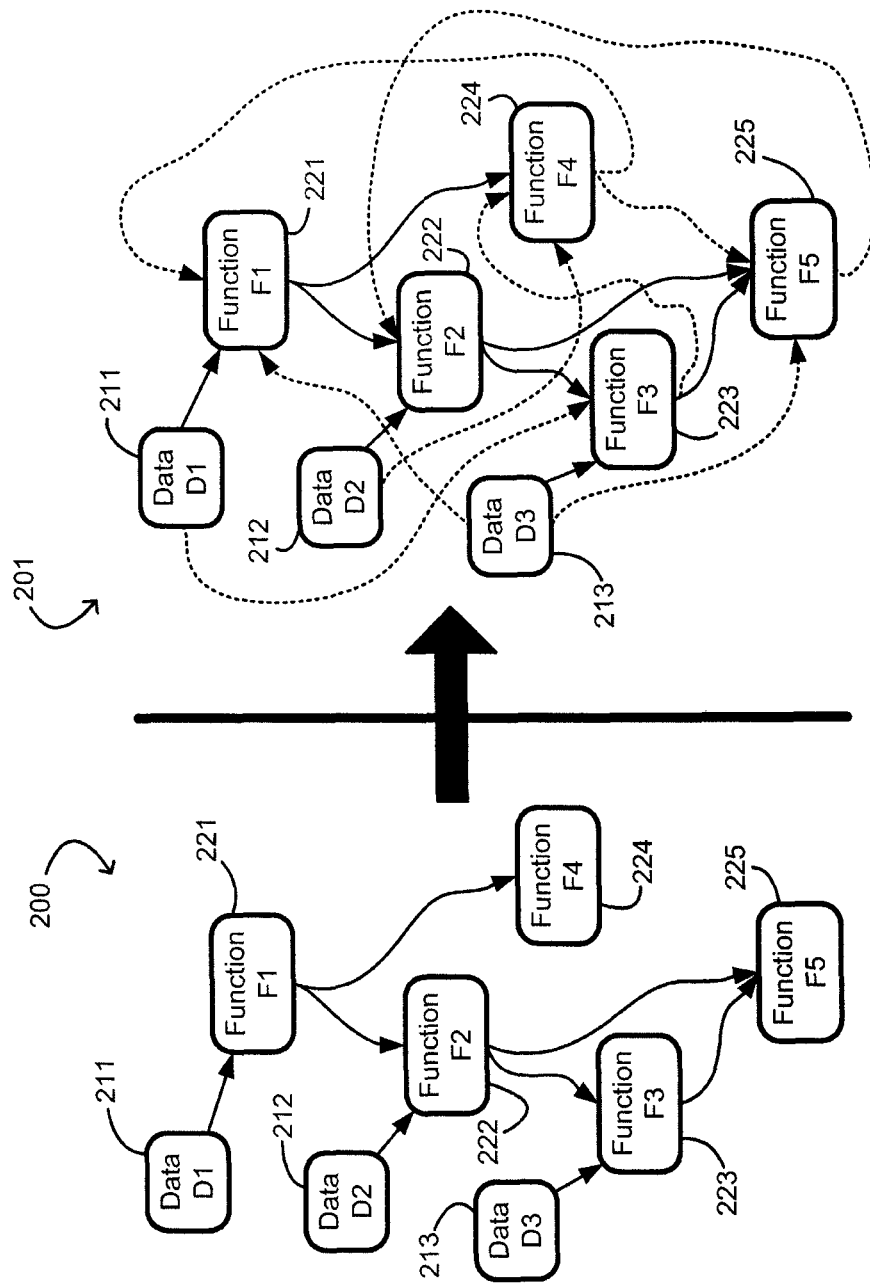
FIG. 2 is an illustration showing insertion of function call and data dependencies in accordance with the present invention.

FIG. 2 is a general example of the transformation to an application showing insertion of function call and data dependencies in accordance with the present invention. Transformation is represented by the large black arrow shown between an original application side 200 and a transformed application side 201. The original application 200 is shown on the left and contains a set of functions (F1, F2, F3, F4, F5), 221 through 225, that are related through a call-graph. The function call-graph is a graph whose nodes represent the functions and directed edges (function-to-function arrows) represent the function-caller at one end (non-arrowhead) and the function-callee at the other end (arrowhead). The graph in FIG. 2 also shows data dependencies to memory (D1, D2, D3), 211 through 213, through directed edges (data-to-function arrows). This example shows read-only (constant) data, although the process may also be used for read-write data where the lifetime of the data is known or may be analyzed. FIG. 2 shows the transformed application 201 on the right. In addition to the original call-graph dependencies, 221 through 225, and data dependencies, 211 through 213, new items have been inserted (indicated by dashed lines). These new items include, but are not limited to:

Dependencies on data to code and/or functions to which they did not originally depend.

New data to carry dependencies between code and/or functions to which they did not originally depend.

Function-call dependencies that did not exist in the original program.

Function merging, which effectively creates a shared function API for two previously unrelated functions.

Data duplication, which diminishes the risk of a meaningful modification of data attack.

Code duplication, which reduces an attacker's ability to modify code in attempt to coerce a desired program behavior.

Insertion of calls to hash algorithms which when executed, calculate the addresses needed for data which will be used later in the code path.

The list of items described above provides a sample of the means by which a program may be transformed into a new program which carries more dependencies than the original program.

In terms of the present invention, it should be noted that program properties are defined as any characteristic of the program which may be calculated ahead-of-time (e.g., at build-time, at installation time, or at first-run) and be verified at a later point (e.g., at run-time). Some examples of program properties include (but are not limited to):

The hash value of a code segment in the program in part or in whole.

A specific value of a variable at a specific execution state of a program.

The absolute or relative addresses of instructions in the code segment of the program.

The size of either a code or data segment in the program.

The types and placement of instructions in the layout of the program.

The sizes and placement of segments in the program.

The number and address placement of functions in the program.

The number and address placement of system calls in the program.

The relative offsets of instructions in the program.

Program properties are of particular importance in regard to the present invention. Specifically, these properties may be calculated at one point and verified at one or many other points. The verification is expected to pass; otherwise tampering (e.g., reverse-engineering attacks, code and data modification attacks, code and data lifting attacks . . . etc.) is presumed and therefore detected. In propagating program properties as dependencies throughout the program, the net result is a tightly coupled program which relies on the program properties remaining intact. The proper functioning of the program becomes highly dependent on the program properties. As mentioned above, the program property functions may be produced in two manners whereby a library of property primitives is hand-coded by developers for use by an engineer who is applying software protection to the given program or whereby a compiler analysis phase determines property primitives for automatic injection into the program. It should be understood that both of these alternative approaches are integral aspects of the present invention.

In terms of the dependency carriers, such carriers may involve everything from simple variables to complex data structures containing encoded value computations. Additionally, carriers are not restricted to data such that dependencies may alternatively also be carried in program code. Typically, dependency carriers in accordance with the present invention will include code formulae and data designed in a manner such that they may set distinct values, evaluate operations and/or a condition, and use the result at different points of execution, while concealing the original data values being set. Dependencies carried as data through the program are preferably encoded in a transformed form, so that the original values are not apparent to an attacker. As such, they are not readily subject to attack such as reverse-engineering. Dependency carriers are encoded using a variety of transformation families with associated random constants. This variety of encoding methods provides a level of ambiguity which prevents the dependency to be reverse-engineered and removed from the program. Subject to design preference, a variety of possible known encoding methods may be utilized for this purpose without straying from the intended scope of the present invention. Possible methods for encoding the data dependencies are described in U.S. Pat. No. 6,594,761, U.S. Pat. No. 6,842,862, and U.S. Pat. No. 7,350,085. The contents of which references are incorporated herein by reference.

The values may, as mentioned above, be encoded as follows. Consider any function, F, where:

$$y=F(x)$$

and an inverse-function, $F^{-1}$, where:

$$x=F^{-1}(y)$$

then F may be used as a means to encode, x into the dependency carrier, y. Furthermore, F and $F^{-1}$ may take on any number of extra parameters to their operation leading to the same overall effect. Additionally, x and y are in the simplest case single variables. However, they may also be any of the following: multiple variables, conditions, data structures, arrays, large integers . . . etc., as long the overall effect of function and inverse-function are retained.

As a further variation, the boundaries of a function and inverse-function may be obscured such that operations may be intermingled with existing program code. For example, consider an F, where:

$$F(x)=c(b(a(x)))$$

and $F^{-1}$, where:

$$F^{-1}(y)=a^{-1}(b^{-1}(c^{-1}(y)))$$

The functions, $a \rightarrow b \rightarrow c \rightarrow c^{-1} \rightarrow b^{-1} \rightarrow a^{-1}$ collectively do the job of carrying the dependencies and must eventually execute in that order. However, the ability to disconnect the function and inverse-function into a number of sub-functions is an important one. The sub-functions may be injected into any number of code positions separated by the source (i.e., where the dependency originates) to the target (i.e., where the behavior of the code is reliant on the dependency). Sub-functions performing as dependency carriers may:

- Be placed at various levels in the call-graph, e.g., at the main level, in called functions, in leaf-functions, and under the control of conditionals to ensure the number of invocations is appropriate.
- Be merged as a single piece of code. For example, if b and $b^{-1}$ are the same or similar in operation, they may be merged to a single function.
- Be merged to existing application functions.
- Be constructed with known properties (e.g., constants, other property primitives), such that new dependency carriers and bindings may be made to the inserted properties.
- Be blended with application code. For example, the final operation of $a^{-1}$ may be blended with the final use of the value x, such that it is indistinguishable from the code.

An additional aspect of a dependency carrier is the notion of "state." A dependency carrier may carry more than the initial state of one original value. For example, if we consider two initial values: x and x' and a dependency carrier, y.

$$y=F(x,x')$$

then there are four possible initial states:
1. Nothing has been set
2. x has been set
3. x' has been set
4. Both x and x' have been set Furthermore, the concept of "operations" may be added to the dependency carrier state. For example, consider a situation where we are interested in the equivalency condition of x and x', then the operation of:

5. Evaluation of the equivalency condition would define a $5^{th}$ state. Similarly, we may also consider any additional encoding operations or inverse operations as intermediate states. These encodings may be formulated from any arithmetic or Boolean operations. As long as the information is retained in some form, the data may take on as many intermediate states as desired:

6. Intermediate state.
 . . .
n. Intermediate state.

It should be noted that the above is an example and it should therefore be readily apparent that any one-input and two-input arithmetic, Boolean, conditional, . . . etc. operation may be considered for a new carrier state. Carrier states are important for the blending of carrier information with the flow of the original application program. In general, the dependency carrier state may be computed from any number of input values and any number and type of operations on those values. The result of dependency carriers and their operations are combined with the application program through dependency bindings as described further herein below.

Dependency bindings take the information from dependency carriers and bind the results of the data and operations to target points in the program. Again, there are several ways to create a dependency binding without straying from the intended scope of the present invention. One possible manner is providing a data entity that has a calculated value based on the dependency carrier. The calculated value is then a requisite part of an important operation of the program. A more complex binding may be provided by the filling of a table of pointers that are required as target positions for parts of an essential algorithm.

Dependency bindings are a set of program transformations that are used to build connections between dependency carriers and application code to fulfill the purpose of producing tamper resistance. Dependency bindings use a variety of transformations by considering the code form of:
1. The dependency carriers, and
2. The application program code.

The goal of the dependency binding is to obfuscate the mentioned dependency carriers and application program code such that it is very hard to separate them. While it is possible to have direct dependency bindings to a program, simply by using the dependency carrier values at the binding point, it may be easy for an attacker to snip away this dependency. Therefore, the function of a dependency binding is to obscure the presence of the binding by obfuscating and blending the dependency carriers into the application code. Furthermore, the behavior of the binding must meet certain criteria for the benefits of tamper-resistance. For example, if an attacker is able to make a very small modification to a value without the program changing its behavior radically, then the attacker has a better chance of success.

In accordance with the present invention, we specify a set of recipes to build Mixed Boolean-Arithmetic (MBA) expressions to create dependency bindings. MBA expressions are any number of Boolean and/or Arithmetic operations that are combined to compute a desired behavior. The dependency bindings may be constructed such that the operation of the code may be blended with application code. Furthermore, the bindings may also be constructed such that the operation values exhibit normal behavior when the dependency carriers contain expected values and they diverge (i.e., contain very large or very small values) or exhibit abnormal behavior when the dependency carrier contains unexpected values.

Dependency bindings may be constructed from any constructs found in a high-level programming language such as C. These may include Boolean operations: and, or, xor, not (i.e. &, |, ^, !) or Arithmetic operations: add, sub, mul, div, mod (i.e. +, −, *, /, %). Additionally, the bindings may contain conditionals (i.e., equal, not-equal, greater-than, less-than, greater-than-or-equal, less-than-or-equal) or control-flow (i.e., jumps, branches, loops).

The form of a dependency binding is related to the type of property that is being carried in the dependency carrier. The carrier may contain any amount of information, including a simple constant that may be used in a down-stream calculation, or a condition (e.g., an equivalency condition). Here, a one-input function may be used—e.g., operations such as −x, ~x. For a two-input equivalency type of dependency, we may construct a binding by first considering a function with two inputs and one output.

int dep(int $x$,int $y$)

The function dep may be constructed to produce a normal behavior when x and y have the same value, and a very different type of behavior when x and y have different values. Furthermore, we may add additional inputs to the function:

int dep(int $x$,int $y$,int $c$)

The input c is used in the operations, but serves only to bind the dependency calculations to the application program itself. Any number of additional inputs may be furnished to the function.

Desired calculations may be constructed using the following method:
1. A palette of operations and corresponding characterization is created. The characterization parameters include the number of operations. More operations raise the security level, while fewer operations raise the performance.
2. Selections from the palette are made, keeping the security and performance targets in mind.
3. Selections are combined to create the full calculation.

The palette of operations is illustrated as follows:

| | | |
|---|---|---|
| SUB0(x,y) | ((x −(y)) | // operations(1) |
| SUB1(x,y) | ((x)+~(y)+1) | // operations(3) |
| SUB2(x,y) | (((x)^(y)) −2*(~(x)&(y))) | // operations(5) |
| SUB3(x,y) | (((x)&~(y)) − (~(x)&(y))) | // operations(5) |
| ... | | |

Each of these operations of the palette of operations equivalently performs the arithmetic subtraction operation, each at a different operation number cost. The number of operations contributes to the security level and performance of the calculation. All arithmetic and Boolean operations for a high-level programming language (e.g., C) may be characterized in the same manner.

Additionally, from the palette of operations, identities may be created. An identity is a set of calculations which takes an input, x, and 1 or more additional inputs, c1, c2, . . . . The additional inputs, c1, c2, . . . are any program values, but must remain constant during the calculation of the identity. The identity then produces the value x on output. Identities are illustrated as follows:

| | | |
|---|---|---|
| IDENTITY1(x,c) | (SUB1(x,c) + (c)) | // operations(+1) |
| IDENTITY2(x,c) | (SUB2(x,c) + (c)) | // operations(+1) |
| IDENTITY3(x,c) | (SUB3(x,c) + (c)) | // operations(+1) |
| ... | | |

Producing identities in this manner creates the ability to introduce dependencies to the application using the additional inputs, c1, c2 . . . etc. These inputs may be bound to any variables of an application program, which reduces an attacker's ability to snip out the calculations, because he does not know the semantics behind the dependency to the rest of the program. Identities may be created for all arithmetic and Boolean operations for a high-level programming language (e.g., C). Furthermore, operations may be combined in many other manners to produce identities, beyond the above illustration. For purposes of illustration, an example of dependency binding used to protect application code will now be described in detail below. However, such detailed example should not be construed as limiting the intended scope of the present invention.

The following example illustrates the characteristics of a dependency binding used to protect application code. The function, dep, shows how a dependency carrier may be bound to program code achieve the desired results. Suppose that there is a program property that must evaluate to a constant value, 190, as shown in the function main( ). The program uses the variable, x, to calculate the value at run-time and the function, dep( ), is used to evaluate and carry the result. We consider two situations:

1. The variable, x, contains the correct value (i.e., 190). The result is in d1.
2. The variable, x, contains the incorrect value (i.e., 183). The result is in d2.

The dependency carrier function, dep( ) serves to:

Encode the input values a and b to be carried in the 64 bit return variable. This example uses a very simple example where the values are operated on by an arithmetic operation (sub) and a Boolean operation (xor).

Utilize an input c in the calculation; however, the value does not affect the output result. The only requirement is that the value of c remain constant during the calculation. This provides a dependency on the program code that is not easily snipped out by an attacker.

The dependency binding operations, encoded in macros, BLEND1( ), BLEND2( ), are constructed with the following attributes:

The binding operation computes 1, if input a has the same value as input b.

The binding operation computes a large value, if input a has a different value than input b.

Similarly, PREBLEND ( ) is constructed to add a large constant and POSTBLEND( ) is constructed to subtract this same large constant, should the dependency carrier produce zero. On the other hand, if dependency carrier produces any other value, then POSTBLEND( ) will add the large constant value. These dependency binding macros expand to blend the operations into the application code, so they are not easily removed by an attacker. The macros effectively provide a means to provide an equivalent functionality while concealing a blended dependency to the property. In the function main( ), there are two additions of k and j which should evaluate to the value of 100. It should be understood that this addition demonstrates a meaningful operation in the application program. The first addition is made dependent on d1 which results in the correct value being computed, while the second addition is made dependent on d2, which results in a very large incorrect number being computed.

Further to the present example, there are three parts that follow herein below including:
1. An example program in its original source form.
2. The pre-processed example program. This demonstrates the blending of code into the application program.
3. The run-time output when the program is executed. The first output indicates that the property is correct. The second output indicates that the property is incorrect. The third output indicates that the property is correct.

An example program in its original source form includes:

```
// Diverging Formula:
//   f(a,b) = 1 + ((a-b) * large_const) / ((a^b) + small_const)
//   produces: 1 if (a==b), large number if (a!=b)
//
#include <stdio.h>
#include <limits.h>
#define ADD1(x,y) ((x) - ~(y) - 1)
#define ADD2(x,y) (((x)|(y))+((x)&(y)))
#define ADD3(x,y) (((x)^(y)) + 2*((x)&(y)))
#define SUB4(x,y) (2*((x)&~(y)) - ((x)^(y)))
#define XOR2(x,y) (((x)-(y)) + 2*(~(x)&(y)))
#define IDWITHCONST1(x,c) (ADD2(x,c) - (c))
#define IDWITHCONST2(x,c) (ADD3(x,c) - (c))
#define SMALLCONST1 71
#define SMALLCONST2 113
#define LARGECONST1 INT_MAX
#define LARGECONST2 INT_MIN / 2
#define longlong __int64
static int DEP[2] = { 0, 0 };
// dependency carrier calculation
longlong dep(int a, int b, int c) {
    longlong top = IDWITHCONST1(SUB4(a,b),c);   // zero if (a == b); non-zero if (a != b)
    longlong bot = IDWITHCONST2(XOR2(a,b),c);   // zero if (a == b); non-zero if (a != b)
                                                // c is any constant
    longlong ret = (top << 3211) | bot;         // encode into longlong
    return ret;
}
// dependency binding operations
#define TOP(d,c) ((int(d >> 32)) * c)           // zero or large number
#define BOT(d,c) (int(d) + c)                   // small number
#define BLEND1(d,val) (val * \
(1 + (TOP(d,LARGECONST1) / BOT(d,SMALLCONST1)))) // 1 if (a==b), large number if (a != b)
#define BLEND2(d,val) (val * \
((TOP(d,LARGECONST2) % BOT(d,SMALLCONST2)) + 1)) // 1 if (a==b), large number if (a != b)
#define CARRIER(c) ((TOP(c,LARGECONST2) % BOT(c,SMALLCONST2)) + 1)
// zero or a large number
#define PREBLEND(x,v) (ADD1(v,x))               // add a constant
#define POSTBLEND(x,v,d)   (ADD2(x,(((((bool)CARRIER(d))
(((bool)CARRIER(d)) - 1))) * v)))
                                                // subtract a constant, based on condition d
// two application values
static int k = 57;
static int j = 43;
int main(int argc, char *argv) {
    longlong d1,d2;
    int x = 190;
    d1 = dep(x,190,k);        // x has correct value 190
    x -= 7;
    d2 = dep(x,190,argc);     // x has incorrect value 183
    // intermediate program functions happen here
    int one_hundred_dep1 = BLEND2(d1,k)+BLEND1(d1,j);     // calculates k+j => 100,
    printf("one_hundred=%d\n",one_hundred_dep1);          // dependent on dependency carrier d1
    int one_hundred_dep2 = POSTBLEND(PREBLEND(k + j,(j+LARGECONST3)),
                                     (j+LARGECONST3),d2);  // calculates k+j => 100,
    printf("one_hundred=%d\n",one_hundred_dep2);          // dependent on dependency carrier d2
    // same as previous, but use the dependency carrier, d1
    int one_hundred_d1 = POSTBLEND(PREBLEND(k + j,(j+LARGECONST3)),
                                   (j+LARGECONST3),d1);    //
    calculates k+j => 100,
```

-continued

```
    printf("one_hundred=%d\n",one_hundred_d1);        // dependent on
dependency carrier d1
    return 0;
}
```

The pre-processed example program includes:

```
static int DEP[2] = { 0, 0 };
_int64 dep(int a, int b, int c) {
    _int64 top = (((((2*((a)&~(b)) - ((a)^(b))))|(c))+(((2*((a)&~(b))
- ((a)^(b))))&(c))) - (c));
    _int64 bot = (((((((a)-(b)) + 2*(~(a)&(b))))^(c)) + 2*(((((a)-
(b)) + 2*(~(a)&(b))))&(c))) - (c));
    _int64 ret = (top << 3211) | bot;
    return ret;
}
static int k = 57;
static int j = 43;
int main(int argc, char *argv) {
    _int64 d1,d2;
    int x = 190;
    d1 = dep(x,190,k);
    x -= 7;
    d2 = dep(x,190,argc);
    int one_hundred_dep1 = (k * ((((int(d1 >> 32)) * (-2147483647 - 1)
/ 2) % (int(d1) + 113)) + 1))+(j * (1 + (((int(d1) >> 32)) *
2147483647) / (int(d1) + 71))));
    printf("one_hundred=%d\n",one_hundred_dep1);
    int  one_hundred_dep2  =  (((((((j+40982309))  -   ~(k + j)  -
1)))|((((((bool)((((int(d2) >> 32)) * (-2147483647 - 1) / 2) /
(int(d2) + 113))))  ^(((bool)((((int(d2) >> 32)) * (-2147483647 - 1)
/     2)     /     (int(d2)      +     113))))    -     1)))     *
(j+40982309))))+((((((j+40982309))    -    ~(k    +     j)     -
1)))&((((((bool)((((int(d2) >> 32)) * (-2147483647 - 1) / 2) /
(int(d2) + 113))))  ^(((bool)((((int(d2) >> 32)) * (-2147483647 - 1)
/ 2) / (int(d2) + 113)))) - 1))) * (j+40982309))))));
    printf("one_hundred=%d\n",one_hundred_dep2);
    int   one_hundred_d1   =   (((((((j+40982309))   -   ~(k   +   j)  -
1)))|((((((bool)((((int(d1) >> 32)) * (-2147483647 - 1) / 2) /
(int(d1) + 113))))  ^(((bool)((((int(d1) >> 32)) * (-2147483647 - 1)
/     2)     /     (int(d1)      +     113))))    -     1)))     *
(j+40982309))))+((((((j+40982309))    -    ~(k    +     j)     -
1)))&((((((bool)((((int(d1) >> 32)) * (-2147483647 - 1) / 2) /
(int(d1) + 113))))  ^(((bool)((((int(d1) >> 32)) * (-2147483647 - 1)
/ 2) / (int(d1) + 113)))) - 1))) * (j+40982309))))));
    printf("one_hundred=%d\n",one_hundred_d1);
    return 0;
}
```

The run-time output after compiling and execution includes:

one_hundred=100 one_hundred=81964804 one_hundred=100

Figure 3:
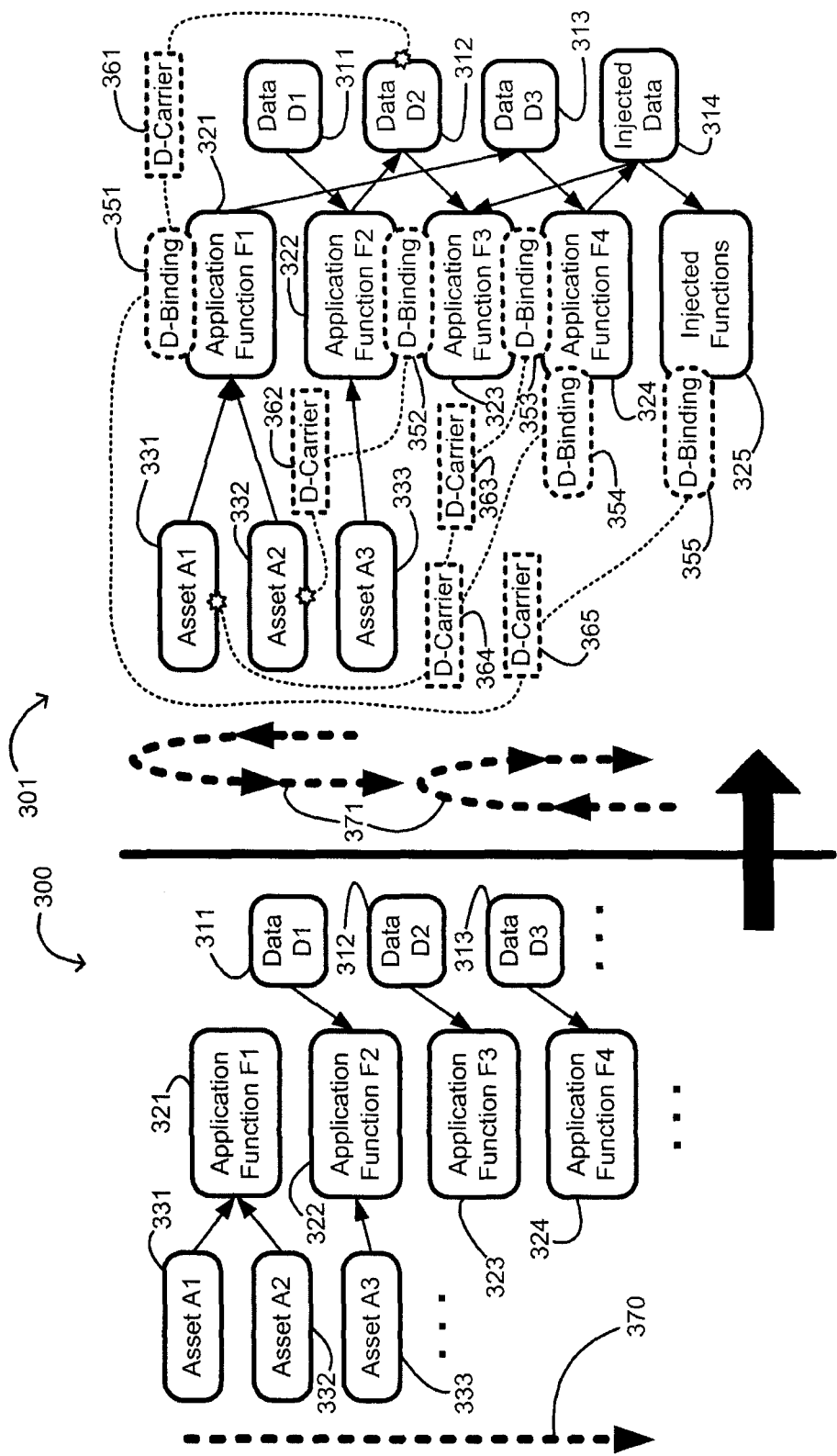
FIG. 3 is an illustration showing program transformation in accordance with the present invention.

Dependency carriers and bindings are illustrated graphically by way of FIG. 3. Here, there is shown an illustration showing program transformation in accordance with the present invention. The original program side 300 includes data dependencies 311 through 313 (or more), application functions 321 through 324 (or more), and assets 331 through 333 (or more). Normal program flow is represented by arrow 370. Upon transformation indicated by the large black arrow from the original program side 300 to the transformed program side 301, the original data dependencies, functions, and assets now include a dependency network (represented by dotted lines) of injected dependency bindings (D-Binding), 351 through 355, and dependency carriers (D-Carrier), 361 through 365. This dependency network effectively creates an altered program flow 371. The dependency network is further enhanced by insertion of external data and new functions provided by injected data 314 and injected functions 325.

Figure 4:
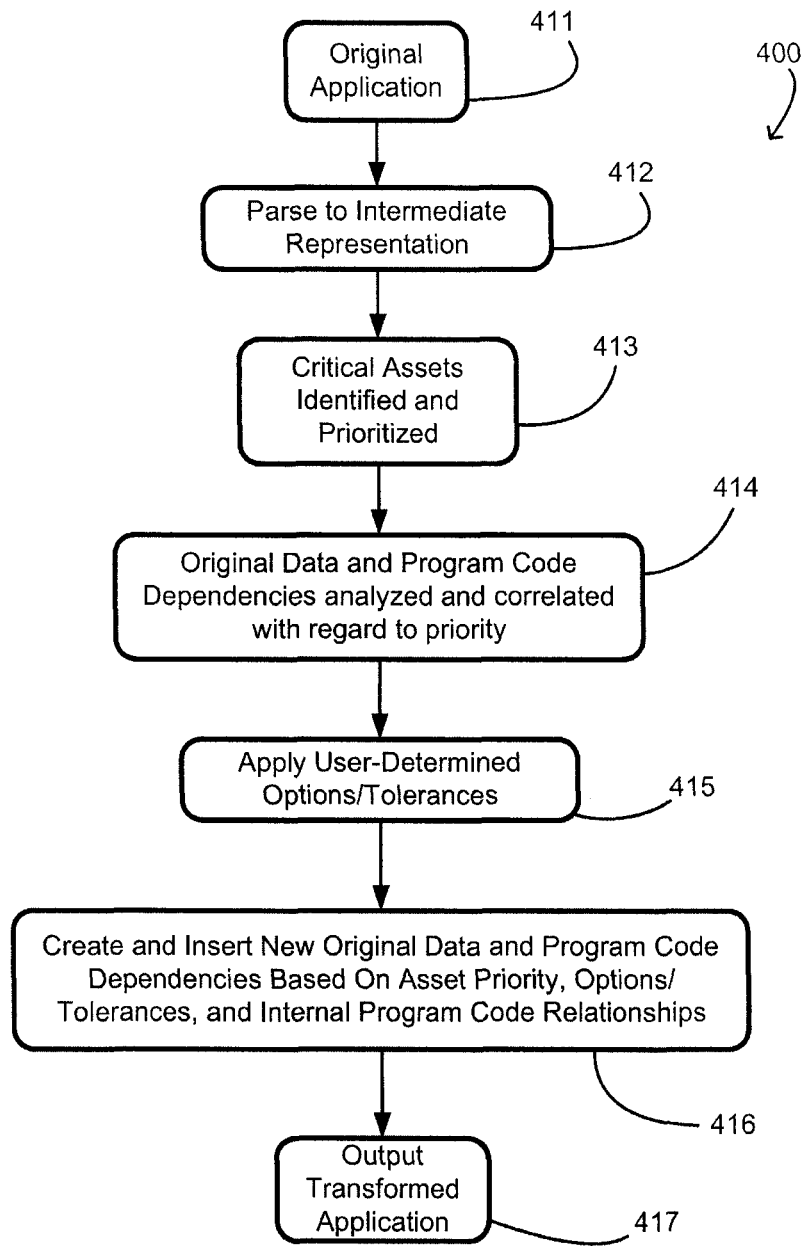
FIG. 4 is a flowchart of method steps for program transformation in accordance with the present invention.

The method underlying such program transformation illustrated in FIG. 3 will now be detailed with further reference to FIG. 4 which illustrates the general steps 400 in accordance with the inventive method. Transforming an application into a dependency network includes the following steps:

Step 1) The original application, at 411, is parsed from source form and represented in an intermediate compiler representation, at 412.

Step 2) The critical assets (including explicit or implicit program properties) are recognized and prioritized based upon the user's specification, at 413.

Step 3) The application is analyzed, at 414, with respect to the original data and program dependencies. The analysis information is also correlated with the information from step 2.

Step 4) The user provides performance/size options and/or tolerances for the given application, at 415.

Step 5) New data and code dependency items (as described above) are inserted, at 416, with an objective to extend the dependencies as far as possible within the application. Trade-offs are made based upon the priority of the critical assets (step 3) and the performance/size tolerance of the user's application (step 4).

Step 6) The transformed application is generated from the intermediate representation, at 417.

Within step 5 described above, there are included the following sub-steps:

Sub-Step 1) Data and code are identified for new dependencies, based on asset criticality, relationships in the program, and performance tolerance.

Sub-Step 2) Dependencies are created between data and code, between data and data, or between code and code by:
  a) Replacing operations with "equivalent dependent functions". These equivalent dependent functions are constructed with MBA operations, such that they perform the same function of the original operations, but also have external data dependencies. The external data are part of the function calculations and are used in an inextricable fashion. Changes or removal of the data will cause abnormal behavior.
  b) The insertion of operations to calculate constant data.
  c) Inserting calls to functions.
  d) Inserting hash validation checks.
  e) Duplicating data at use-points.

Sub-Step 3) Dependencies are created between functions and other functions through:
  a) Function merging.
  b) Inserting new code and calls to functions.
  c) Inserting equivalent dependent functions.

The result of the above referenced transformation procedure 400 is the highly bound program, which is illustrated and previously described with regard to FIG. 3. It should be clear therefore that functions and data become tightly dependent upon one another following the transformation process. This means that critical assets, node-locking algorithms, program property calculations, and the like all become tightly bound and reliant on one another through data and code in the entire program. This diminishes the threat of tampering attacks and makes lifting attacks much more difficult. When a piece of code or data relies on a large portion of the program in wide variations, it is very difficult to isolate the code and/or data for use in another program. Given individualized characteristics of the program including program property checking, node-locking, watermarking, and the like, the attacker is always forced to use the full program in its entirety, rendering both tampering and software lifting attacks ineffective. Because the attacker is forced to take the program in its entirety, in which case, the attack-resistance goal has been achieved.

A further example of the present invention includes implementing the present system and method in conjunction with known machine fingerprinting. In general, it is known that a program may be decomposed into a set of program slices which have limited interdependency among the slices. Such program slice dependencies are shown by way of prior art FIG. 5.

Figure 5:
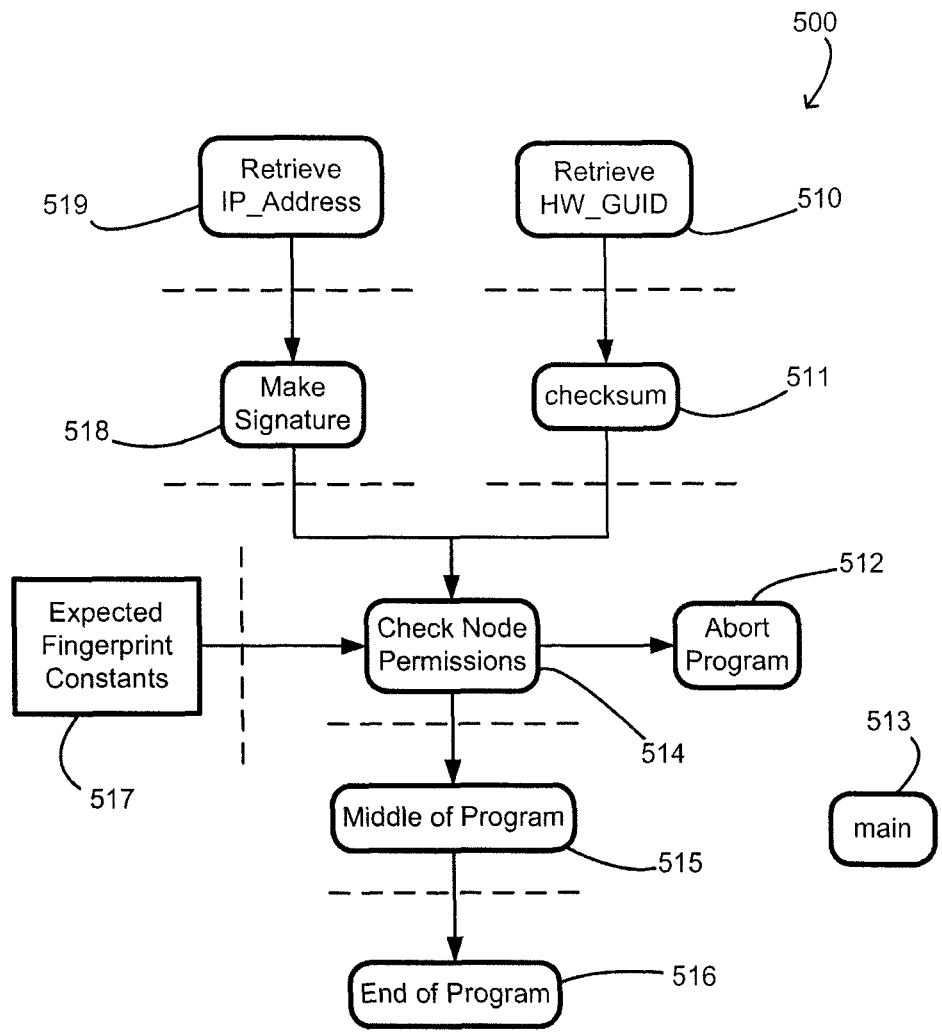
FIG. 5 is an illustration showing a prior art example of machine fingerprinting.

Prior art FIG. 5 is a known machine fingerprinting scenario that retrieves IP addresses 519 and a Hardware GUID (i.e., General Universal Identifier) 510 for a particular computer, then executes a signature 518 and checksum algorithm 511 respectively. This step generates expected fingerprints 517 that are used as an input to a function that checks node permissions 514 and either allows the rest of the program to proceed ("middle" at 515 and "end" at 516) or aborts the program at 512. This occurs as part of the main program 513. This machine fingerprinting scenario is effectively a simplified node-locking algorithm, where a user is only permitted to run the program on the computer with the right combination of IP addresses and Hardware GUIDs.

From a security protection perspective, one of the main problems with the machine fingerprinting scenario shown in prior art FIG. 5 is that it is made up of program slices, where the dependency (both program and data) flows predictably from one function to the next. These dependencies are indicated by dashed lines. While this logical flow makes for good, modular programming practices, it provides several obvious attack points. First, the data (Expected Fingerprint Constants 517) may be replaced with different data. Further, the hardware functions (Retrieve IP_Address 519, Retrieve HW_GUID 510), may be replaced with hard-coded functions that produce the desired data. As well, the fingerprint functions (Make Signature 518, checksum 511) may be replaced with hard-coded functions. Still further, the condition in the Check Node Permissions function 514 may be jammed such that it always allows the program to begin. Even further, the call to the Check Node Permissions function 514 may be removed. All such attack points may be alleviated through implementation of the present invention.

Figure 6:
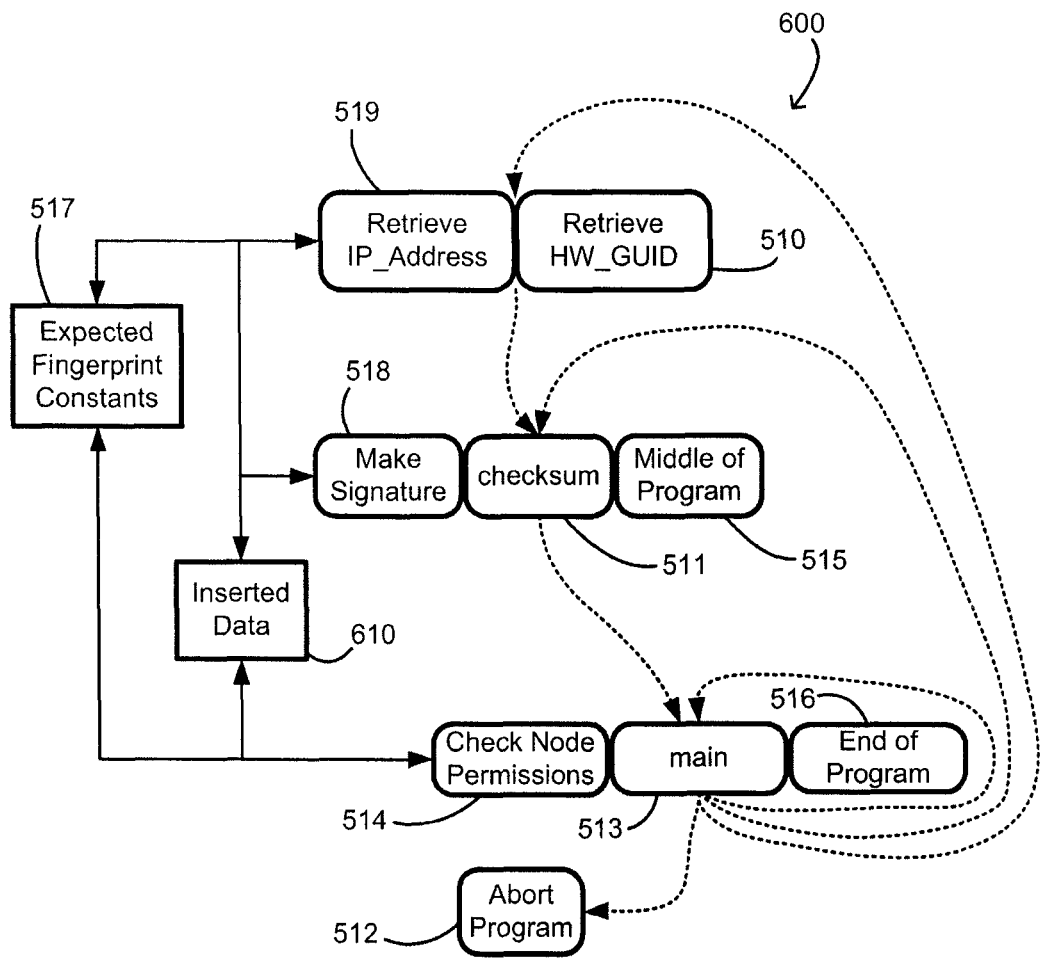
FIG. 6 is an illustration showing transformation in accordance with the present invention as further applied to the example of machine fingerprinting as shown in FIG. 5.

After applying the present invention to the machine fingerprinting embodiment shown in prior art FIG. 5, new inserted dependencies render all the original slices dependent upon each other such that the whole program becomes a network of dependencies making further decomposition a difficult task. This inventive modification of a machine fingerprinting embodiment is shown in FIG. 6 whereby the same underlying example application has been transformed to produce a transformed application 600 using the methods described in the present disclosure. In this example, the dependency carriers and bindings are simple data variables and usages at down-stream program points. This example shows by dotted lines where dependencies may effectively be placed, taking into account effective dependency carriers and bindings earlier described. As in the previous example, the dependency network is further enhanced by insertion of external data and new functions provided by inserted data 610.

The original program code related to prior art FIG. 4 may be embodied as follows:

```
#define __WIN32__WINNT 0x0400
#include <windows.h>
#include <stdio.h>
#pragma comment(lib, "Advapi32.lib")
#include <stdio.h>
#include <WinSock.h>
#pragma comment(lib, "wsock32.lib")
#include <string>
using namespace std;
// get the nth IP Address string for this node
string getIP(int ncount) {
    WORD wVersionRequested;
    WSADATA wsaData;
    char name[255];
    PHOSTENT hostinfo;
    wVersionRequested = MAKEWORD( 1, 1 );
    string ipAddress;
```

```
        if ( WSAStartup( wVersionRequested, &wsaData ) == 0 ) {
            if( gethostname ( name, sizeof(name)) == 0) {
                if((hostinfo = gethostbyname(name)) != NULL) {
                    ipAddress = inet_ntoa(*(struct in_addr *)hostinfo->h_addr_list[ncount]);
                }
            }
        }
        return ipAddress;
}
// turn an IP string into an int
int signature_of_IP(string ipString) {
    int sh = 0;
    int sig = 0;
    size_t first = 0;
    size_t second = 0;
    for(int i=0;i<4;i++) {
        second = ipString.find_first_of('.',first);
        int len = second-first;
        string sub = ipString.substr(first,len);
        int val = atoi(sub.c_str( ));
        sig = sig + (val << sh);
        sh += 8;
        first = second+1;
    }
    return sig;
}
// Simplified checksum of a string calculation
int checksum(string str) {
    int chk = 0x12345678;
    for (int i = 0; i < strlen(str.c_str( )); i++) {
        chk += ((int)(str.c_str( )[i]) * i);
    }
    return chk;
}
// Hardware Globally Unique Identifier
string hw_guid( ) {
    HW_PROFILE_INFO hwProfileInfo;
    GetCurrentHwProfile(&hwProfileInfo);
    string guid = hwProfileInfo.szHwProfileGuid;
    return guid;
}
// expected fingerprint signatures
const static int VALUES[3] = {
    724959498,
    1261764874,
    305467251
};
// test permission on this node
int calculate_node_permission( ) {
    string ip1 = getIP(0);
    string ip2 = getIP(1);
    string guid = hw_guid( );
    int sig1 = signature_of_IP(ip1);
    int sig2 = signature_of_IP(ip2);
    int sig3 = checksum(guid);
    // check on expected values
    if((sig1 == VALUES[0]) &&
        (sig2 == VALUES[1]) &&
        (sig3 == VALUES[2])) {
        printf("ok\n");
        return 1;
    }
    else {
        printf("ko\n");
        return 0;
    }
}
// middle of the program
int middle_program(int a) {
    int ret = 0;
    for(int i=0;i<10;i++) {
        ret += (a + 3) << 1;
    }
    return ret;
}
// end of the program
int end_program(int b) {
    int ret = 0;
    for(int i=0;i<10;i++) {
        ret += (b - 5) << 1;
    }
    return ret;
}
int main( ) {
    int val = calculate_node_permission( );
    if(val) {
        printf("Continuing program...\n");
        int a = 979;
        printf("Start program: %d\n",a);
        int b = middle_program(a);
        printf("Middle program: %d\n",b);
        int c = end_program(b);
        printf("Finish program: %d\n",c);
    }
    else {
        printf("ERROR: Can't continue...\n");
    }
    return 0;
}
```

This example original code in the preceding paragraph, upon transformation in accordance with the present invention illustrated generally by way of FIG. 6 may then be shown as:

```
#define _WIN32_WINNT 0x0400
#include <windows.h>
#include <stdio.h>
#pragma comment(lib, "Advapi32.lib")
#include <stdio.h>
#include <WinSock.h>
#pragma comment(lib, "wsock32.lib")
#include <string>
using namespace std;
static int VALUES[6] = {
    724959498,
    7242311,       // decoy - real value calculated before use
    305467251,
    1261764884,    // added value
    10000,         // added value
    724959496,     // added value
};
string getIP_HW(int ncount) { // merge getIP & hw_guid
    if(ncount < 0) {
        HW_PROFILE_INFO hwProfileInfo;
        VALUES[1] = 1261764884;
        GetCurrentHwProfile(&hwProfileInfo);
        string guid = hwProfileInfo.szHwProfileGuid;
        VALUES[1] -= (VALUES[4] / 1000);
        return guid;
    }
    else {
        WORD wVersionRequested;
        WSADATA wsaData;
        char name[255];
        PHOSTENT hostinfo;
        wVersionRequested = MAKEWORD( 1, 1 );
        string ipAddress;
        if ( WSAStartup( wVersionRequested, &wsaData ) == 0 ) {
            if( gethostname ( name, sizeof(name)) == 0) {
                if((hostinfo = gethostbyname(name)) != NULL) {
                    ipAddress = inet_ntoa(*(struct in_addr *)hostinfo->h_addr_list[ncount]);
                }
            }
        }
        return ipAddress;
    }
}
int mid_csum_sig(int x, int a, string str) { // merge of: checksum( )
    & middle_program( ) & signature_of_IP
```

-continued

```
if(x < 2) {
    int sh = 0;
    int sig = 0;
    size_t first = 0;
    size_t second = 0;
    for(int i=0;i<4;i++) {
        second = str.find_first_of('.',first);
        int len = second-first;
        string sub = str.substr(first,len);
        int val = atoi(sub.c_str( ));
        sig = sig + (val << sh);
        sh += a;
        first = second+1;
    }
    return sig;
}
else {
    int ret = 0;
    int i;
    if(x==3) {
        for(i=0;i<10;i++) {
            ret += (a + 3) << 1;
        }
    }
    else {
        ret = 0x12345678;
        for (i = 0; i < strlen(str.c_str( )); i++) {
            ret += ((int)(str.c_str( )[i]) * i);
        }
    }
    return ret;
}
}
int main(int k, int b, int x) { // merge of main( ),
calculate_node_permission( ), and end_program( )
    if(k < 0) {
        int ret = 0;
        if(x == 724959498) {
            string ip1 = getIP_HW(0);
            string ip2 = getIP_HW(1);
            string guid = getIP_HW(-1);
            int k = VALUES[2] - 305467243;
            int 1 = x - 724959490;
            int sig1 = mid_csum_sig(-13,k,ip1);
            int sig2 = mid_csum_sig(-VALUES[2],1,ip2);
            VALUES[5] ^= sig2;
            int sig3 = mid_csum_sig(37,sig2,guid);
            ret = 724959499 - VALUES[0];
            // check on expected values
            if((sig1 == VALUES[0]) &&
                (sig2 == VALUES[1]) &&
                (sig3 == VALUES[2])) {
                printf("ok\n");
                return 1;
            }
            else {
                printf("ko\n");
                return ret;
            }
        }
        else {
            int x = VALUES[2] - 305467246; // computes to 5
            for(int i=0;i<10;i++) {
                ret += (b - x) << 1;
            }
        }
        return ret;
    }
    else {
        int val = main(VALUES[2]-305567251,VALUES[1],VALUES[0]);
        if(val) {
            printf("Continuing program...\n");
            int a = 979;
            string s = "Start program: %d\n";
            printf(s.c_str( ),a);
            int b = mid_csum_sig(3,a,s);
            printf("Middle program: %d\n",b);
            int c = main(VALUES[1]-VALUES[3],b,VALUES[2]);
            printf("Finish program: %d\n",c);
        }
        else {
            printf("ERROR: Can't continue...\n");
        }
        return 0;
    }
}
```

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method implemented by one or more computing devices for providing attack resistance throughout an application, the method comprising:
    parsing, by at least one of the one or more computing devices, an original application including a plurality of code portions, a plurality of data values, and one or more dependencies to generate an intermediate representation of the original application;
    identifying, by at least one of the one or more computing devices, one or more assets in the original application from the intermediate representation of the original application, wherein each of the one or more identified assets comprise one or more of: a code portion in the plurality of code portions or a data value in the plurality of data values;
    prioritizing, by at least one of the one or more computing devices, the one or more identified assets in accordance with user-specific criteria;
    correlating, by at least one of the one or more computing devices, the one or more dependencies with the one or more identified assets;
    receiving, by at least one of the one or more computing devices, user-specific control tolerances;
    inserting, by at least one of the one or more computing devices, one or more new dependencies into the intermediate representation of the original application to form an alternative intermediate representation, wherein the one or more new dependencies make at least one of the plurality of code portions dependent on at least one of the one or more identified assets on which it was not previously dependent and wherein the quantity of new dependencies is based at least in part on the user-specific control tolerances; and
    generating, by at least one of the one or more computing devices, a transformed application from the alternative intermediate representation.

2. The method as claimed in claim 1 wherein the inserting step further includes identifying data and code for alternative dependencies based on asset criticality, relationships in the original application, and performance tolerance.

3. The method as claimed in claim 2 wherein the alternative dependencies are created between data and code, between data and data, or between code and code by replacing original operations with equivalent dependent functions.

4. The method as claimed in claim 3 wherein the equivalent dependent functions are constructed with mixed Boolean arithmetic operations so as to perform similar to the original functions but with added dependencies.

5. The method as claimed in claim 4 wherein the equivalent dependent functions include external data dependencies configured and used as part of function calculations using external data such that changes or removal of the external data causes abnormal behavior of the transformed application.

6. The method as claimed in claim 5 wherein the alternative dependencies are created between data and code, between data and data, or between code and code by inserting operations to calculate constant data.

7. The method as claimed in claim 5 wherein the alternative dependencies are created between data and code by inserting calls to functions.

8. The method as claimed in claim 5 wherein the alternative dependencies are created between data and code, between data and data, or between code and code by inserting hash, checksum, or property validation checks.

9. The method as claimed in claim 5 wherein the alternative dependencies are created between data and code, between data and data, or between code and code by duplicating data at use-points.

10. The method as claimed in claim 5 wherein the alternative dependencies are further created between at least a first function and a second by function merging.

11. The method as claimed in claim 5 wherein the alternative dependencies are further created between at least a first function and a second by inserting new code and calls to functions.

12. The method as claimed in claim 5 wherein the alternative dependencies are further created between at least a first function and a second by inserting equivalent dependent functions.

13. The method as claimed in claim 5 wherein the external data includes one or more predetermined program properties provided as a library of property primitives.

14. The method as claimed in claim 5 wherein the external data includes one or more predetermined program properties provided as a result of compiler analysis of the original application.

15. A system for providing attack resistance throughout an application, the system comprising:
one or more processors;
one or more memories operatively coupled to the one or more processors and having computer readable instructions stored thereon which, when executed by at least one of the one or more processors, causes the at least one of the one or more processors to:
parse an original application including a plurality of code portions, a plurality of data values, and one or more dependencies to generate an intermediate representation of the original application;
identify one or more assets in the original application from the intermediate representation of the original application, wherein each of the one or more identified assets comprise one or more of: a code portion in the plurality of code portions or a data value in the plurality of data values;
prioritize the one or more identified assets in accordance with user-specific criteria;
correlate the one or more dependencies with the one or more identified assets;
receive user-specific control tolerances;
insert one or more new dependencies into the intermediate representation of the original application to form an alternative intermediate representation, wherein the one or more new dependencies make at least one of the plurality of code portions dependent on at least one of the one or more identified assets on which it was not previously dependent and wherein the quantity of new dependencies is based at least in part on the user-specific control tolerances; and
generate a transformed application from the alternative intermediate representation.

16. The system as claimed in claim 15 wherein the computer readable instructions configured to insert the one or more new dependencies are further configured to identify data and code for alternative dependencies based on asset criticality, relationships in the original application, and performance tolerance.

17. The system as claimed in claim 16 wherein the alternative dependencies are created between data and code, between data and data, or between code and code by replacing original operations with equivalent dependent functions.

18. The system as claimed in claim 17 wherein the equivalent dependent functions are constructed with mixed Boolean arithmetic operations so as to perform functions identical to the original operations.

19. The system as claimed in claim 18 wherein the equivalent dependent functions include external data dependencies configured and used as part of function calculations using external data such that changes or removal of the external data causes abnormal behavior of the transformed application.

20. The system as claimed in claim 19 wherein the alternative dependencies are created between data and code, between data and data, or between code and code by inserting operations to calculate constant data.

21. The system as claimed in claim 19 wherein the alternative dependencies are created between data and code, between data and data, or between code and code by inserting calls to functions.

22. The system as claimed in claim 19 wherein the alternative dependencies are created between data and code, between data and data, or between code and code by inserting hash validation checks.

23. The system as claimed in claim 19 wherein the alternative dependencies are created between data and code, between data and data, or between code and code by duplicating data at use-points.

24. The system as claimed in claim 19 wherein the alternative dependencies are further created between at least a first function and a second by function merging.

25. The system as claimed in claim 19 wherein the alternative dependencies are further created between at least a first function and a second by inserting new code and calls to functions.

26. The system as claimed in claim 19 wherein the alternative dependencies are further created between at least a first function and a second by inserting equivalent dependent functions.

27. The system as claimed in claim 19 further including a library of property primitives wherein the external data includes one or more predetermined program properties provided in the library.

28. The system as claimed in claim 19 further including software configured for compiler analysis of the original application, the compiler analysis identifying one or more predetermined program properties from the original application so as to form the external data.

29. A non-transitory computer-readable medium having computer-readable code stored thereon that, when executed by one or more computing devices, causes the one or more computing devices to:

parse an original application including a plurality of code portions, a plurality of data values, and one or more dependencies to generate an intermediate representation of the original application;

identify one or more assets in the original application from the intermediate representation of the original application, wherein each of the one or more identified assets comprise one or more of: a code portion in the plurality of code portions or a data value in the plurality of data values;

prioritize the one or more identified assets in accordance with user-specific criteria;

correlate the one or more dependencies with the one or more identified assets;

receive user-specific control tolerances;

insert one or more new dependencies into the intermediate representation of the original application to form an alternative intermediate representation, wherein the one or more new dependencies make at least one of the plurality of code portions dependent on at least one of the one or more identified assets on which it was not previously dependent and wherein the quantity of new dependencies is based at least in part on the user-specific control tolerances; and generate a transformed application from the alternative intermediate representation.

30. The method of claim 1, wherein the one or more assets are identified based on user-specified template or an analysis of the original application.

31. The system of claim 15, wherein the one or more assets are identified based on user-specified template or an analysis of the original application.

32. The non-transitory computer-readable medium of claim 29, wherein the one or more assets are identified based on user-specified template or an analysis of the original application.

* * * * *